Feb. 19, 1929.

A. M. SMITH

GIRDLING TOOL

Filed March 28, 1927

Inventor
Alford M. Smith
by Francis C. Huebner,
Attorney.

Patented Feb. 19, 1929.

1,702,801

UNITED STATES PATENT OFFICE.

ALFORD MERRILL SMITH, OF FRESNO, CALIFORNIA.

GIRDLING TOOL.

Application filed March 28, 1927. Serial No. 179,153.

Figure 1:
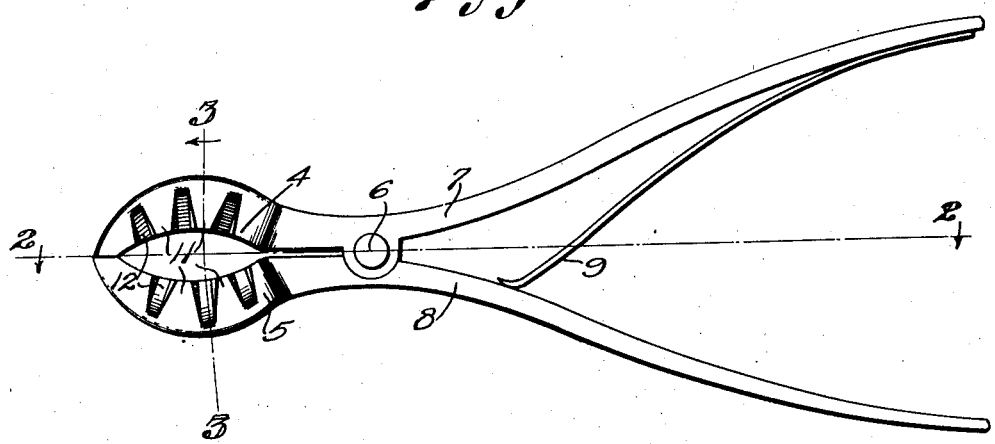
Figure 2:
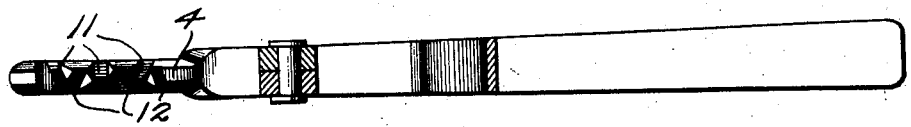
Figure 3:
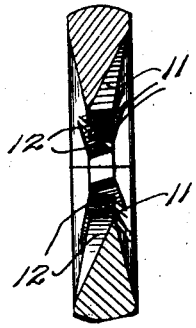
Figure 4:
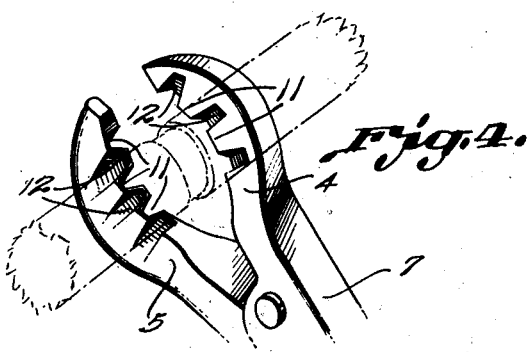

My invention relates to a girdling tool. It is the practice in some grape growing districts to peel a narrow strip of bark from around the grape vine during the summer months for the purpose of invigorating and enlarging the grapes which are growing thereon. To accomplish this girdling it has heretofore been the practice to use an ordinary knife with which are made parallel cuts around the vine, and then to pick out the bark between such cuts with the point of the knife. This form of work is slow and cannot be done uniformly, inasmuch as the depth of the cuts cannot be regulated, as the hand pressure applied varies at different times and under various conditions, and the vines to be girdled are not usually of uniform rotundity. My invention relates to a girdling tool which will automatically cut and peel a uniform strip of bark at a uniform depth and which will clean itself of the bark cut away from around vine stocks. These and other objects hereinafter disclosed are accomplished by means of the invention hereinafter described and illustrated in the accompanying drawing in which Fig. 1 shows a side view of the tool. Fig. 2 is a sectional view on line 2—2 of Fig. 1, showing the cutting edge of one of the jaws. Fig. 3 is a sectional view on line 3—3 of Fig. 1. Fig. 4 shows the assembled jaws, disclosing their operative relation when in use.

In said drawing I have shown two jaws 4 and 5 which are hinged together by a pivot 6. Extending from said jaws are handles 7 and 8. As will be noted on the drawing, the arrangement of the parts described is such that by pressing the handles 7 and 8 together the jaws 4 and 5 will separate and by releasing the hand pressure, a spring 9 will automatically press the handles apart and close the jaws. The inside of the jaws have an inwardly curved cutting edge. The cutting edge or member is formed on the jaws as follows. Two parallel rows of blades are attached to, or formed integral with each jaw, each row consisting of a plurality of approximately uniform sized blades 11 and 12 which are spaced apart in the row, the arrangement of the two rows on each jaw being such that the interstices in one row are directly opposite to the blades in the other row. Blades are formed connecting the blades in opposite rows, the cross blades being positioned at approximately right angles to the blades in the two parallel rows. The line of the cutting edge as thus formed on each jaw might be termed as approximately right angle meandering. The cutting members are positioned on the jaws so they are adjacent. The approaching portions or faces of the jaws have concave cutting blades, the line of the cutting blade on each jaw describing a series of approximate right angles assembled so that a plurality of open radial channels are formed, the openings in adjacent channels being on opposite sides of the blade. In operating this device the handles are pressed together which movement opens the jaws, a vine is then inserted between the jaws and the pressure on the handle is then released sufficient to permit the spring to close the jaws or grasp the vine. By giving the tool a short radial movement the strip of bark is separated from the vine. Inasmuch as the depth of the cut is regulated by the tension of the spring, the cut is approximately uniform. As shown in the drawing, the recesses or channels in the jaw formed by the meandering line of the cutting edge slope outwardly to the side faces of the jaw, and this shape assists in cleaning the tool of the cut out portions of the bark. The widths of the interstices are narrower at the cutting edge than toward the back of the jaw or blade. This shape likewise prevents the cut pieces of bark from being wedged in the knife.

While a leaf spring is shown, any equivalent spring means can be adapted for the use disclosed.

Having described my invention I claim—

1. A girdling tool comprising two jaws adapted to be held in a yieldable closed position by spring means, the approaching portions of the jaws having blades positioned thereon so that the line of the cutting edge of said blade is a series of approximately right angle meanderings.

2. A girdling tool comprising two jaws pivoted so that they can open and close in relation to each other, handles attached to the jaws adapted to open the jaws when the handles are pressed together, spring means adapted to move the jaws in a closed relation, a cutting edge on the approaching face of each jaw, the line of said cutting edge describing a plurality of approximate right angles joined together so that a plurality of open channels are formed, adjacent channels being open on opposite sides.

3. A girdling tool comprising two combined jaws and handles pivoted together so that by pressing the handles together the jaws will automatically separate, and by pulling the handles apart the jaws will assume a closed relationship, spring means for closing the jaws, the approaching portions of the jaws having concave cutting blades, the line of the cutting blade on each jaw describing a series of approximate right angles assembled so that a plurality of radial channels are formed, the openings in adjacent channels being on opposite sides of the blade.

ALFORD MERRILL SMITH.